United States Patent
Liu et al.

(10) Patent No.: US 12,308,459 B2
(45) Date of Patent: May 20, 2025

(54) BATTERY MODULE, BATTERY PACK, POWER CONSUMPTION APPARATUS, AND MANUFACTURING METHOD AND MANUFACTURING DEVICE OF BATTERY MODULE

(71) Applicant: CONTEMPORARY AMPEREX TECHNOLOGY (HONG KONG) LIMITED, Hong Kong (CN)

(72) Inventors: Qian Liu, Fujian (CN); Chengdu Liang, Fujian (CN); Yonghuang Ye, Fujian (CN); Haizu Jin, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 510 days.

(21) Appl. No.: 17/887,220

(22) Filed: Aug. 12, 2022

(65) Prior Publication Data

US 2022/0399607 A1 Dec. 15, 2022

Related U.S. Application Data

(63) Continuation of application No. PCT/CN2020/139184, filed on Dec. 24, 2020.

(51) Int. Cl.
*H01M 50/267* (2021.01)
*H01M 4/02* (2006.01)
(Continued)

(52) U.S. Cl.
CPC ......... *H01M 50/267* (2021.01); *H01M 4/386* (2013.01); *H01M 4/387* (2013.01);
(Continued)

(58) Field of Classification Search
CPC .. H01M 50/267; H01M 50/249; H01M 50/51; H01M 50/204; H01M 4/386;
(Continued)

(56) References Cited

U.S. PATENT DOCUMENTS

| | | |
|---|---|---|
| 2014/0265554 A1 | 9/2014 | Yang et al. |
| 2020/0067125 A1 | 2/2020 | Shen et al. |

(Continued)

FOREIGN PATENT DOCUMENTS

| | | | |
|---|---|---|---|
| CN | 101471438 A | 7/2009 | |
| CN | 101743675 A * | 6/2010 | ............... B60K 6/28 |

(Continued)

OTHER PUBLICATIONS

Machine Translation of CN101743675A (Mar. 8, 2025) (Year: 2025).*

(Continued)

*Primary Examiner* — Matthew J Merkling
(74) *Attorney, Agent, or Firm* — Scully, Scott, Murphy & Presser, P.C.

(57) ABSTRACT

The present application relates to a battery module including a first-type battery cell and a second-type battery cell at least connected in series, where the first-type battery cell and the second-type battery cell are battery cells of different chemical systems, the first-type battery cell includes N first battery cell(s), and the second-type battery cell includes M second battery cell(s), where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

14 Claims, 3 Drawing Sheets

(51) Int. Cl.
  *H01M 4/38* (2006.01)
  *H01M 4/485* (2010.01)
  *H01M 4/583* (2010.01)
  *H01M 50/204* (2021.01)
  *H01M 50/249* (2021.01)
  *H01M 50/51* (2021.01)

(52) U.S. Cl.
  CPC .......... *H01M 4/485* (2013.01); *H01M 4/583* (2013.01); *H01M 50/204* (2021.01); *H01M 50/249* (2021.01); *H01M 50/51* (2021.01); H01M 2004/021 (2013.01); H01M 2004/027 (2013.01); H01M 2220/20 (2013.01)

(58) Field of Classification Search
  CPC ...... H01M 4/387; H01M 4/485; H01M 4/583; H01M 2220/20
  See application file for complete search history.

(56) References Cited

U.S. PATENT DOCUMENTS

| | | | | |
|---|---|---|---|---|
| 2020/0130511 | A1* | 4/2020 | Botts | B60L 58/22 |
| 2021/0043894 | A1* | 2/2021 | Cornelli | H01M 10/425 |
| 2022/0059864 | A1 | 2/2022 | Shen et al. | |
| 2022/0190619 | A1* | 6/2022 | Fasching | H01M 10/443 |
| 2023/0366943 | A1* | 11/2023 | Wang | G01R 31/367 |
| 2023/0375628 | A1* | 11/2023 | Duan | G01R 31/3842 |
| 2024/0391354 | A1* | 11/2024 | Hu | H02J 7/0016 |
| 2024/0393399 | A1* | 11/2024 | Yao | G01R 31/3648 |

FOREIGN PATENT DOCUMENTS

| | | |
|---|---|---|
| CN | 102185123 A | 9/2011 |
| CN | 103311562 A | 9/2013 |
| CN | 110048151 A | 7/2019 |
| CN | 110380144 A | 10/2019 |
| EP | 3614462 A1 | 2/2020 |
| EP | 3736587 A1 | 11/2020 |
| WO | 2020186357 A1 | 9/2020 |

OTHER PUBLICATIONS

Written Opinion dated Mar. 7, 2022 received in International Application No. PCT/CN2020/139184.
Extended European Search Report dated Oct. 27, 2022 received in European Patent Application No. EP 20945720.9.
International Search Report dated Sep. 26, 2021 issued in PCT/CN2020/139184.
First Office Action dated May 18, 2024 received in Chinese Patent Application No. 202080055106.5.
Invitation to correct deficiencies dated Mar. 10, 2025 for European Patent Application No. 20945720.9.

* cited by examiner

BATTERY MODULE, BATTERY PACK, POWER CONSUMPTION APPARATUS, AND MANUFACTURING METHOD AND MANUFACTURING DEVICE OF BATTERY MODULE

CROSS-REFERENCE TO RELATED APPLICATIONS

This application is a continuation of International Application No. PCT/CN2020/139184, filed on Dec. 24, 2020, which is hereby incorporated by reference in its entirety.

TECHNICAL FIELD

The present application relates to the technical field of energy storage devices, and in particular to a battery module, a battery pack, a power consumption apparatus, and a manufacturing method of a battery module and a manufacturing device of a battery module.

BACKGROUND

Secondary batteries have the advantages of small size, high energy density, high power density, many cycles of use and long storage time, and are widely used in some electronic devices, electric vehicles, electric toys and electric equipment, such as mobile phones, circletops, battery cars, electric cars, electric airplanes, electric ships, electric toy cars, electric toy ships, electric toy airplanes, electric tools, or the like. Secondary batteries are used as power driving power supply of new energy vehicles or large-capacity storage unit of energy storage power stations. Usually, multiple battery cells need to be connected in series and parallel to obtain a battery module and a battery pack with a higher volumetric energy density.

In order to improve the safety of secondary batteries in groups, several technical solutions are proposed to connect multiple battery cells of different chemical systems in series and/or in parallel to form a battery module. One type of battery cell is, for example, a ternary battery cell containing lithium nickel cobalt manganate metallic oxide with a high energy density, and another type of battery cell is, for example, a battery cell containing lithium iron phosphate with higher safety. However, battery cells of different chemical systems differ significantly in capacity attenuation characteristics, charging-discharging characteristics during a cycle process, and the like. After battery cells with different electrochemical characteristics are connected in series to form a battery module, long-term cycle performance of the battery module is often limited by a battery cell with the worst cycle performance due to a cask effect, which makes it difficult for some battery cells of the battery module to give full play to their electrical performance advantages.

Therefore, how to match the battery cells of different chemical systems in the battery module to achieve the long-term cycle performance of the battery module is an urgent technical problem to be solved in the field of secondary batteries.

SUMMARY

As for the key technology of hybrid series battery cells, the prior art only stays at a conceptual level, and there is no specific implementation solution for how to match battery cells of different chemical systems. In particular, in the prior art, there is no record or disclosure of indicators such as capacity characteristics and cycle life of a battery module formed by mixing multiple battery cells in series.

The present application is completed in view of the above problems in the prior art, and its object is to provide a battery module that optimizes the design of capacities of battery cells of different chemical systems in the battery module by matching total charge capacities of negative electrode sheets of the battery cells of different chemical systems, so as to realize the long cycle life of the hybrid series module.

A first aspect of the present application provides a battery module including a first-type battery cell and a second-type battery cell at least connected in series, where the first-type battery cell and the second-type battery cell are battery cells of different chemical systems, the first-type battery cell includes at least one of N first battery cells, and the second-type battery cell includes at least one of M second battery cells, where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

Optionally, when the battery state of health (SOH) of the first battery cell is the same as the SOH of the second battery cell, and the state of charge (SOC) of the first battery cell is the same as the SOC of the second battery cell, the ratio of the total charge capacity of the first negative electrode sheet to the total charge capacity of the second negative electrode sheet is 0.9 to 1.1.

Optionally, a ratio of a discharge capacity of the first negative electrode sheet to a discharge capacity of the second negative electrode sheet is 0.8 to 1.2. Optionally, the ratio of the discharge capacity of the first negative electrode sheet to the discharge capacity of the second negative electrode sheet is 0.9 to 1.1.

Optionally, a ratio of a rated capacity of the first-type battery cell to a rated capacity of the second-type battery cell is 0.8 to 1.2, optionally, 0.9 to 1.1.

Optionally, the first negative electrode sheet and the second negative electrode sheet further satisfy at least one of the following conditions: (1) a ratio of a compacted density of the first negative electrode sheet to a compacted density of the second negative electrode sheet is 0.85 to 1.15, optionally, 0.95 to 1.05; (2) a ratio of coating mass per unit area of the first negative electrode sheet to coating mass per unit area of the second negative electrode sheet is 0.85 to 1.15, optionally, 0.95 to 1.05; and (3) a ratio of porosity of the first negative electrode sheet to porosity of the second negative electrode sheet is 0.8 to 1.25, optionally, 0.9 to 1.1.

Optionally, a density of the first negative electrode sheet and a density of the second negative electrode sheet are each independently 1.0 g/cm$^3$ to 1.9 g/cm$^3$, optionally, 1.2 g/cm$^3$ to 1.8 g/cm$^3$.

Optionally, coating mass per unit area of the first negative electrode sheet and coating mass per unit area of the second negative electrode sheet are each independently 6 mg/cm$^2$ to 17 mg/cm$^2$, optionally, 8 mg/cm$^2$ to 14 mg/cm$^2$.

Optionally, porosity of the first negative electrode sheet and porosity of the second negative electrode sheet are each independently 15% to 35%, optionally, 20% to 30%.

Optionally, a negative active substance of the first negative electrode sheet and a negative active substance of the second negative electrode sheet may be independently selected from one or more of artificial graphite, natural graphite, soft carbon, hard carbon, silicon-based materials, tin-based materials, and lithium titanate, optionally, the negative active substance of the first negative electrode sheet and the negative active substance of the second negative electrode sheet have the same composition.

Optionally, a ratio of the number of first-type battery cells to the number of second-type battery cells is 0.1 to 50, optionally, 2 to 10.

A second aspect of the present application provides a battery pack including the battery module according to the first aspect.

A third aspect of the present application provides a power consumption apparatus including the battery module according to the first aspect or the battery pack according to the second aspect, where the battery module or the battery pack is used as a power supply or an energy storage unit of the power consumption apparatus.

A fourth aspect of the present application provides a manufacturing method of a battery module, including the following steps: obtaining a first-type battery cell and a second-type battery cell, where the first-type battery cell and the second-type battery cell are battery cells of different chemical systems, the first-type battery cell includes at least one of N first battery cells, and the second-type battery cell includes at least one of M second battery cells, where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2; and electrically connecting the first-type battery cell and the second-type battery cell in a manner including series connection to form the battery module according to the first aspect.

A fifth aspect of the present application provides a manufacturing device of a battery module, including: a clamping arm unit configured to obtain a first-type battery cell and a second-type battery cell, where the first-type battery cell and the second-type battery cell are battery cells of different chemical systems, the first-type battery cell includes at least one of N first battery cells, and the second-type battery cell includes at least one of M second battery cells, where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2; an assembling unit configured to electrically connect the first-type battery cell and the second-type battery cell in a manner including series connection to form the battery module according to the first aspect; and a control unit configured to control the clamping arm unit and the assembling unit.

Technical Effect

In the present application, a battery module includes a first-type battery cell and a second-type battery cell of different chemical systems at least connected in series. In the present application, total charge capacities of negative electrode sheets of the first-type battery cell and the second-type battery cell in the battery module are set within a specific range to ensure that life attenuation rates of the battery cells of different chemical systems during long-term use are as close as possible, thereby avoiding the short life of a certain type of battery cell in the hybrid series module, and significantly improving the overall cycle life of the module.

Since a battery pack and a power consumption apparatus in the present application include the battery module, they have at least the same technical advantages as the battery module.

Figure 1:
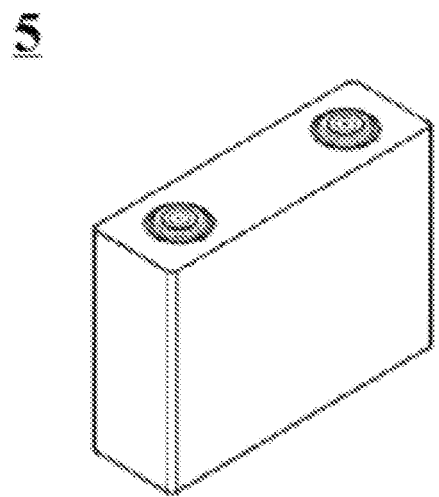
FIG. 1 is a schematic diagram showing an example of a battery cell of the present application.

LABEL DESCRIPTION 5, 5a, 5b Battery cell
51 Housing
52 Electrode assembly
53 Cover plate
4 Battery module
1 Battery pack
2 Upper box
3 Lower box

DESCRIPTION OF EMBODIMENTS

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

In the present application, unless otherwise specified, all embodiments and preferred embodiments mentioned herein may be combined with each other to form a new technical solution.

In the present application, unless otherwise specified, all technical features and preferred features mentioned herein may be combined with each other to form a new technical solution.

In the present application, unless otherwise specified, all steps mentioned herein may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

In the present application, unless otherwise specified, "comprising" and "containing" mentioned herein are open-ended or closed-ended. For example, the "comprising" and "containing" may mean that other components that are not listed may further be comprised or contained, or only listed components may be comprised or contained.

In the description herein, it should be noted that, unless otherwise specified, "no more than" and "no less than" include all numbers within that range including the end values, and "more" in "one or more" means two or more.

In the description herein, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

[Battery Cell]

In the present application, a "battery cell" refers to a cell capable of charging and discharging independently. Components of a battery cell may include a positive electrode sheet, a negative electrode sheet, a separator, an electrolytic solution, an outer package for packaging the positive electrode sheet, the negative electrode sheet, the separator, and the electrolytic solution, or the like. In the present application, types and shapes of the battery cell are not specifically restricted, which may be a pouch battery cell, a cylindrical battery cell, a square battery cell and other types of battery cells. The battery cell in the present application may be a lithium ion battery cell, a potassium ion battery cell, a sodium ion battery cell, a lithium sulfur battery cell, or the like, and particularly preferably, a lithium ion battery cell. During charging and discharging of a battery, active ions are intercalated and disintercalated back and forth between the positive electrode sheet and the negative electrode sheet. The electrolytic solution plays a role of conducting ions between the positive electrode sheet and the negative electrode sheet.

In the present application, a "chemical system" of a battery cell is classified according to components of a positive active material used in a positive electrode sheet in the battery cell, and elements or substances doped or coated in the positive active material are not limited. For example, a battery cell whose positive active material is lithium iron phosphate (including that doped with Mn or V element) may be defined as a battery cell of a lithium iron phosphate chemical system. A battery cell whose positive active material is lithium nickel cobalt manganate (generally referred to as NCM for short) may be defined as a battery cell of an NCM chemical system. Further, a battery cell chemical system may be further limited based on the relative content of nickel, cobalt, and manganese elements in the positive active material. For example, a battery cell whose positive active material is $LiNi_{0.5}Co_{0.2}Mn_{0.3}O_2$ (generally referred to as NCM523 for short) may be defined as a battery cell of an NCM523 chemical system, a battery cell whose positive active material is $LiNi_{0.6}Co_{0.2}Mn_{0.2}O_2$ (generally referred to as NCM622 for short) may be defined as a battery cell of an NCM622 chemical system, and a battery cell whose positive active material is $LiNi_{0.8}Co_{0.1}Mn_{0.1}O_2$ (generally referred to as NCM811 for short) may be defined as a battery cell of an NCM811 chemical system. A battery cell whose positive material is nickel cobalt lithium aluminate (generally referred to as NCA) may be defined as a battery cell of an NCA chemical system. In addition, in the present application, a battery cell of a hybrid system may also be used, for example, a battery cell of a hybrid system including NCM and NCA.

Hereinafter, basic structures of a positive electrode sheet, a negative electrode sheet, an electrolytic solution and a separator included in the battery cell in the present application will be described first.

<Negative Electrode Sheet>

The battery cell of the present application includes a negative electrode sheet, the negative electrode sheet includes a negative current collector and a negative film layer arranged on at least one surface of the negative current collector, and the negative film layer includes a negative active material.

In one embodiment of the present application, the negative active material of the negative film layer includes common negative active materials, for example, one or more of natural graphite, artificial graphite, soft carbon, hard carbon, silicon-based materials, tin-based materials and lithium titanate. The silicon-based materials may be selected from one or more of elemental silicon, silicon oxide, and silicon-carbon composite. The tin-based materials may be selected from one or more of elemental tin, tin oxide compounds, and tin alloys.

In the battery cell of the present application, the negative film sheet includes a negative active material, an optional binder, an optional conductive agent and other optional adjuvants, and is usually formed by coating and drying a negative slurry. The negative slurry is usually formed by dispersing the negative active material, the optional conductive agent and binder, and the like in a solvent and stirring them evenly. The solvent may be N-methylpyrrolidone (NMP) or deionized water.

As an example, the conductive agent may include one or more of superconducting carbon, carbon black (such as acetylene black, Ketjen black), carbon dots, carbon nanotubes, graphene, and carbon nanofibers.

As an example, the binder may include one or more of styrene butadiene rubber (SBR), water-soluble unsaturated resin SR-1B, polyacrylic acid (PAA), polyacrylate sodium (PAAS), polyacrylamide (PAM), polyvinyl alcohol (PVA), sodium alginate (SA) and carboxymethyl chitosan (CMCS). As an example, the binder may include one or more of styrene butadiene rubber (SBR), polyvinyl alcohol (PVA), sodium alginate (SA), polymethacrylic acid (PMAA) and carboxymethyl chitosan (CMCS). Other optional adjuvants are, for example, thickeners (such as sodium carboxymethyl cellulose CMC-Na), PTC thermistor materials, and the like.

In addition, in the battery cell of the present application, the negative electrode sheet does not exclude other additional functional layers other than the negative film layer. For example, in some embodiments, the negative electrode sheet of the present application may further include a conductive primer layer (for example, made of the conductive agent and the binder) sandwiched between the negative current collector and a first negative film layer and disposed on a surface of the negative current collector. In some other embodiments, the negative electrode sheet of the present application may further include a covering protective layer covering a surface of a second negative film layer.

In the battery cell of the present application, the negative current collector may be a metal foil or a composite current collector. For example, the metal foil may be a copper foil, a silver foil, an iron foil, or a foil composed of an alloy of the foregoing metals. The composite current collector may include a polymer material base layer and a metal layer formed on at least one surface of the polymer material base layer, and may be formed by synthesizing a metal material (copper, copper alloy, nickel, nickel alloy, titanium, titanium alloy, silver, silver alloy, or the like) on the polymer material base layer (such as a base layer made of polypropylene PP, polyethylene terephthalate PET, polybutylene terephthalate PBT, polystyrene PS, polyethylene PE and their copolymers).

<Positive Electrode Sheet>

In the battery cell of the present application, the positive electrode sheet includes a positive current collector, and a positive film layer arranged on at least one surface of the positive current collector and including a positive active material. For example, the positive current collector has two opposite surfaces in its thickness direction, and the positive film layer is disposed on either or both of the two opposite surfaces of the positive current collector. In the battery cell of the present application, the positive current collector may be a metal foil or a composite current collector, for example, the metal foil may be an aluminum foil, while the composite current collector may include a polymer material base layer and a metal layer formed on at least one surface of the polymer material base layer. The composite current collector can be formed by synthesizing a metal material (aluminum, aluminum alloy, nickel, nickel alloy, titanium, titanium alloy, silver, silver alloy, or the like) on a polymer material substrate (such as a substrate of polypropylene PP, polyethylene terephthalate PET, polybutylene terephthalate PBT, polystyrene PS, polyethylene PE and their copolymers).

In the battery cell of the present application, the positive active material may be a positive active material for the battery cell known in the art. For example, the positive active material may include one or more of the following: lithium containing phosphate in an olivine structure, lithium transition metal oxide and their respective modified compounds. But the present application is not limited to these materials, and other traditional materials that can be used as positive active materials of the battery cell may also be used. One type of these positive active materials may be used alone, or two or more types may be used in combination. Examples of the lithium transition metal oxide may include, but are not limited to, one or more of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), $LiNi_{0.8}Co_{0.1}Mn_{0.1}O_2$ (NCM811)), lithium nickel cobalt aluminum oxide (such as $LiNi_{0.85}Co_{0.15}Al_{0.05}O_2$) and their modified compounds. Examples of the lithium containing phosphate in the olivine structure may include, but are not limited to, one or more of lithium iron phosphate (such as $LiFePO_4$ (LFP)), a composite material of lithium iron phosphate and carbon, lithium manganese phosphate (such as $LiMnPO_4$), a composite material of lithium manganese phosphate and carbon, lithium manganese iron phosphate, and a composite material of lithium manganese iron phosphate and carbon.

In some embodiments, the positive film layer may also optionally include a binder. Non-limiting examples for the binder of the positive film layer may include one or more of the following: polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluoroacrylate resin.

In some embodiments, the positive film layer may further optionally include a conductive agent. Examples for the conductive agent of the positive film layer may include one or more of superconducting carbon, acetylene black, carbon black, Ketjen black, carbon dots, carbon nanotubes, graphene, and carbon nanofibers.

In one embodiment of the present application, the positive electrode can be prepared in the following manner. The above components for preparing the positive electrode, such as the positive active material, the conductive agent, the binder, and any other components are dispersed in a solvent (such as N-methylpyrrolidone) to form a uniform positive slurry, the positive slurry is coated on the positive current collector, and then after drying, cold pressing and other processes, the positive electrode sheet can be obtained.

<Electrolytic Solution>

An electrolytic solution plays a role of conducting ions between a positive electrode sheet and a negative electrode sheet. The electrolytic solution includes an electrolyte salt and a solvent. In some embodiments, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluoroborate (LiDFOB), lithium bis(oxalate)borate (LiBOB), lithium difluorophosphate ($LiPO_2F_2$), lithium difluorobisoxalate phosphate (LiDFOP) and lithium tetrafluorooxalate phosphate (LiTFOP).

In one embodiment of the present application, the solvent may be selected from one or more of the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS) and diethyl sulfone (ESE).

In one embodiment of the present application, based on a total weight of the electrolytic solution, the content of the solvent is 60-99% by weight, such as 65-95% by weight, or 70-90% by weight, or 75-89% by weight, or 80-85% by weight. In one embodiment of the present application, based on a total weight of the electrolytic solution, the content of the electrolyte is 1-40% by weight, for example, 5-35% by weight, or 10-30% by weight, or 11-25% by weight, or 15-20% by weight.

In one embodiment of the present application, the electrolytic solution may further optionally include an additive. For example, the additive may include one or more of the following: a negative film-forming additive, a positive film-forming additive, and an additive that can improve certain performance of a battery, such as an additive that improves overcharging performance of a battery, an additive that improves high-temperature performance of a battery, and an additive that improves low-temperature performance of a battery.

<Separator>

In one embodiment of the present application, the battery cell further includes a separator, which separates an anode side and a cathode side of the battery cell, and provides selective penetration or barrier to substances of different types, sizes, and charges in a system. For example, the separator can insulate electrons, physically separate positive and negative active substances of the battery cell, prevent internal short circuits and form an electric field in a certain direction, and at the same time enable ions in the battery to pass through the separator and move between positive and negative electrodes.

In one embodiment of the present application, a material used to prepare the separator may include one or more of glass fiber, non-woven fabric, polyethylene, polypropylene, and polyvinylidene fluoride. The separator may be a single-layer film or a multilayer composite film. When the separator is a multilayer composite film, materials of layers may be the same or different.

In one embodiment of the present application, the above positive electrode sheet, negative electrode sheet and separator may be made into an electrode assembly/a bare battery cell through a winding process or a lamination process.

In one embodiment of the present application, the battery cell may include an outer package, and the outer package may be used to package the above electrode assembly and electrolytic solution. In some embodiments, the outer package of the battery cell may be a hard shell, such as a hard plastic shell, an aluminum shell, a steel shell, and the like. In other embodiments, the outer package of the battery cell may be a soft package, such as a bag-type soft package. A material of the soft package may be plastic, for example, one or more of polypropylene (PP), polybutylene terephthalate (PBT), polybutylene succinate (PBS), and the like.

Figure 2:
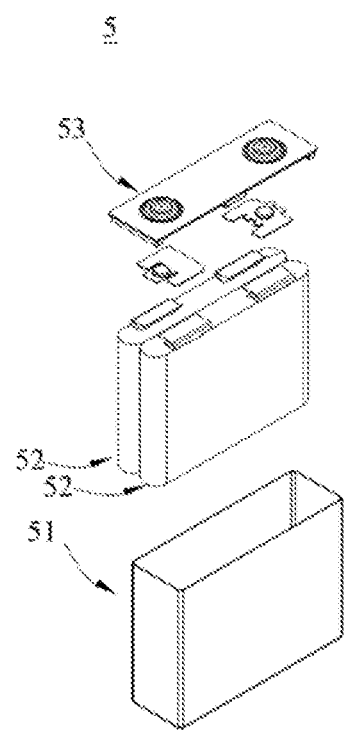
FIG. 2 is an exploded view showing an example of the battery cell of the present application shown in FIG. 1.

FIG. 1 is a schematic diagram showing an example of a battery cell 5 of the present application. FIG. 2 is an exploded view showing an example of the battery cell 5 of the present application shown in FIG. 1.

The outer package may include a housing 51 and a cover plate 53, and the housing 51 may include a bottom plate and a side plate connected to the bottom plate. The bottom plate and the side plate enclose and form an accommodating cavity. The housing 51 has an opening communicating with the accommodating cavity, and the cover plate 53 can cover the opening to close the accommodating cavity. A positive electrode sheet, a negative electrode sheet and a separator can form an electrode assembly 52 through a winding process or a lamination process, the electrode assembly is packaged in the accommodating cavity, and an electrolytic solution is infiltrated in the electrode assembly 52. The number of electrode assemblies 52 contained in the battery cell 5 may be one or more.

[Battery Module]

In the present application, a "battery module" is formed by electrically connecting a certain number of battery cells together and putting them into a frame in order to protect the battery cells from external impact, heat, vibration, etc. The shape of the battery cell of the present application may be cylindrical, square or other arbitrary shapes.

In the present application, several battery cells may be assembled together to form a battery module. The battery module contains two or more battery cells, and the specific number depends on the application of the battery module and parameters of a single battery module.

Figure 3:
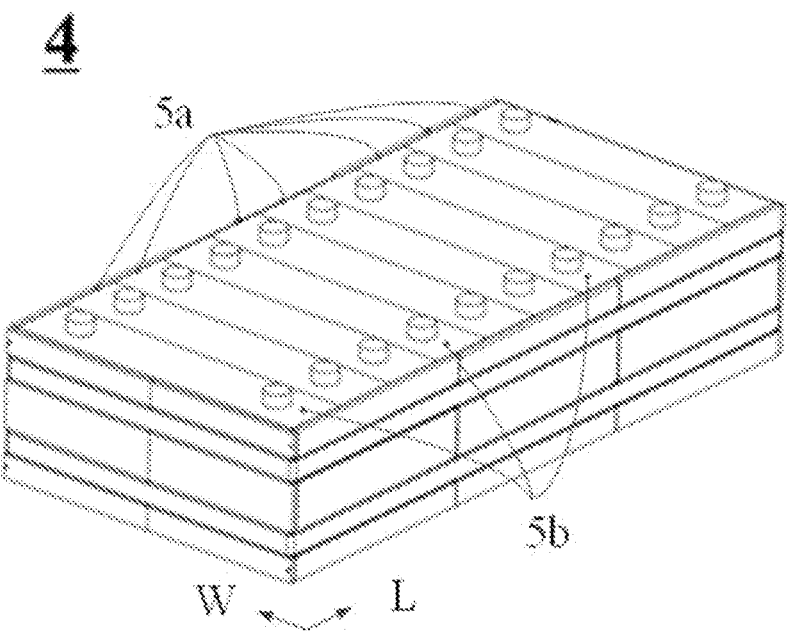
FIG. 3 is a schematic diagram showing an example of a battery module of the present application.

FIG. 3 is a schematic diagram showing an example of a battery module of the present application. Referring to FIG. 3, in a battery module 4, a plurality of battery cells 5a, 5b may be arranged in sequence along a length direction of the battery module 4 (5a may be a first battery cell, and 5b may be a second battery cell). Certainly, the battery cells may also be arranged in any other manner. Furthermore, the plurality of battery cells 5a, 5b may be fixed by fasteners. Optionally, the battery module 4 may further include a housing with an accommodating space, and the plurality of battery cells of 5a, 5b are accommodated in the accommodating space.

<About Design of First-Type Battery Cell and Second-Type Battery Cell>

In the present application, a battery module includes a first-type battery cell and a second-type battery cell at least connected in series, where the first-type battery cell and the second-type battery cell are battery cells of different chemical systems, the first-type battery cell includes at least one of N battery cells, the second-type battery cell includes at least one of M battery cells, where N and M are positive integers; and when a battery state of health (SOH) of the first battery cell is the same as an SOH of the second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

Specifically, "SOH" stands for State of Health, which refers to a ratio of a current total capacity of a battery cell to an initial total capacity of the battery cell, for example, it may be 100%, 98%, 95%, 90%, 85%, 80%, 75%, and 70%. "SOC" stands for State Of Charge, which refers to a ratio of a current remaining capacity of a battery cell to a rated capacity under the same conditions, for example, it may be 100%, 99%, 90%, 80%, 70%, 60%, 50%, 40%, 30%, 20%, 10%, and 0%.

It should be understood that, due to test accuracy and inevitable test errors, in the present application, that "a battery state of health (SOH) of a first battery cell is the same as an SOH of a second battery cell" refers to that a ratio of an absolute value of difference between the state of health (SOH) of the first battery cell and the SOH of the second battery cell to an average value of the two does not exceed 5%. In the same way, that "a state of charge (SOC) of the first battery cell is the same as an SOC of the second battery cell" refers to that a ratio of an absolute value of difference between the state of charge (SOC) of the first battery cell and the SOC of the second battery cell to an average value of the two does not exceed 5%.

(About SOH Test)

In the present application, the SOH of the first battery cell and the SOH of the second battery cell can be tested by a method known in the art. As an example, the following method can be used for testing:

Referring to testing an actual capacity of a battery cell in GB/T 31484-2015 Cycle Life Requirements and Test Methods for Traction Battery of Electric Vehicle, a ratio of an actual capacity measured using the same test procedure to a rated capacity of a freshly shipped battery cell is SOH.

Test Steps of Actual Capacity (recorded as: Capx):
1) leaving a battery cell to be tested at 25° C. for 30 minutes; 2) performing discharging at a constant current of 0.33 C (C represents a rated capacity of the battery cell, where a charging/discharging current is a rate multiplied by the rated capacity of the battery cell, and the rated capacity is based on a battery cell capacity identified in a GBT certification document of the battery cell, or a battery module to which the battery cell belongs, or a battery pack to which the battery cell belongs) to an end-of-discharge voltage of the battery cell, and then standing for 30 minutes; 3) performing charging at a constant current of 0.33 C to an end-of-charge voltage of the battery cell, performing charging at a constant voltage until the current is <0.05 C, and standing for 5 minutes; and 4) performing discharging at a constant current of 0.33 C to an end-of-discharge voltage of the battery cell, and then standing for 5 minutes. A discharge capacity tested from step 3) to step 4) is recorded as Capx.

The percentage of Capx in the rated capacity C is SOH.

(About SOC Test)

In the present application, the SOC of the first battery cell and the SOC of the second battery cell can be tested using a method known in the art. As an example, the following method can be used for testing:

Referring to testing a capacity that can be released by a battery cell under the same discharge conditions as the rated capacity test procedure in GB/T 31484-2015 Cycle Life Requirements and Test Methods for Traction Battery of Electric Vehicle, the discharge capacity is recorded as Capy, and the percentage of the capacity to the actual capacity Capx of the battery cell is the SOC.

In the present application, the SOH of the first battery cell can be adjusted to be the same as the SOH of the second battery cell by adopting a method known in the art. As an example, the following method can be used for adjustment.

If an SOH of a certain battery cell is low, the SOH of the battery cell can be adjusted as a target SOH of a battery cell with a higher SOH. The adjustment method can refer to a cycle life test method in GB/T 31484-2015 Cycle Life Requirements and Test Methods for Traction Battery of Electric Vehicle until the percentage of an actual capacity of a battery cell to a rated capacity reaches a target value.

The cycle life test procedure is as follows:
1) leaving a battery cell to be tested at 25° C. for 30 minutes; 2) performing discharging at a constant current of 0.33 C to an end-of-discharge voltage of the battery cell, and then standing for 30 minutes; 3) performing charging at a constant current of 0.33 C to an end-of-charge voltage of the battery cell, performing charging at a constant voltage until the current is <0.05 C, and standing for 5 minutes; and 4) performing discharging at a constant current of 0.33 C to an end-of-discharge voltage of the battery cell, and then standing for 5 minutes.

Step 3)-Step 4) are a charge and discharge cycle of the battery cell.

The above step 3)-step 4) are repeated n times until the discharge capacity for the n-th time Capn=target SOH*rated capacity.

In the present application, the SOC of the first battery cell can be adjusted to be the same as the SOC of the second battery cell by adopting a method known in the art. As an example, the following method can be used for adjustment.

The method of adjusting the SOC is as follows:
1) setting a target SOC, such as 0% SOC; 2) leaving a battery cell to be tested at 25° C. for 30 minutes; 3) performing discharging at a constant current of 0.33 C to an end-of-discharge voltage of the battery cell, and then standing for 30 minutes, and the battery cell thus reaching 0% SOC, where if the target SOC is x % SOC, procedure steps of adjusting the SOC are as follows: 1) leaving a battery cell to be tested at 25° C. for 30 minutes; 2) performing discharging at a constant current of 0.33 C to an end-of-discharge voltage of the battery cell, and then standing for 30 minutes; 3) performing charging at a constant current of 0.33 C to an end-of-charge voltage of the battery cell, performing charging at a constant voltage until the current is <0.05 C, and then standing for 5 minutes; 4) performing discharging at a constant current of 0.33 C to an end-of-discharge voltage of the battery cell, and then standing for 5 minutes, where a discharge capacity tested from step 3) to step 4) is recorded as Capx; 5) performing charging at a constant current of 0.33 C to an end-of-charge voltage of the battery cell, performing charging at a constant voltage until the current is <0.05 C, and standing for 5 minutes; and 6) performing discharging at a constant current of 0.33 C until the remaining capacity=x % SOC*Capx, and then standing for 5 minutes.

(About Test of Total Charge Capacity of Negative Electrode Sheet)

In the present application, the total charge capacity of the negative electrode sheet refers to the amount of lithium ions that the negative electrode sheet can accept, and the unit is mAh or Ah. The total charge capacity of the negative electrode sheet of the first battery cell and the total charge capacity of the negative electrode sheet of the second battery cell can be tested by a method known in the art. As an example, the following method can be used for testing.

(1) Electrode sheet sampling requirements are as follows:

Taking a single-sided coated and cold-pressed negative electrode sheet (if it is a double-sided coated electrode sheet, a negative film layer on one side is wiped off first), or a negative electrode sheet obtained from the disassembly of a battery cell (leaving a battery cell at 25° C. for 30 minutes; performing discharging at a constant current of 0.33 C to an end-of-discharge voltage of the battery cell, standing for 30 minutes for full discharge, then disassembling the battery cell, and taking out a negative electrode sheet, where if it is a double-sided coated electrode sheet, a negative film layer on one side is wiped off first, rinsed with DMC solution appropriately, and dried for later use); and using a ruler to measure length and width of the negative electrode sheet, where an area of the negative electrode sheet is equal to the product of the length and the width, and a sampling position of the negative electrode sheet is: selected to be any position in the middle from the edge>15 mm;

(2) Assembling a coin-type half cell by using the side of the negative electrode sheet with the negative film layer and a lithium sheet as counter electrodes; and (3) A charge capacity of the negative electrode sheet per unit area, and a total charge capacity of the negative electrode sheet:

where a test voltage is 0.05-2.0V, a test temperature is 25° C., and a charging/discharging rate is 0.1 C; no less than ten parallel samples are taken to test a charge capacity of the button-type half cell respectively; by removing the minimum and maximum values and taking an average value, the charge capacity of the negative electrode sheet under the area is obtained; and by dividing the charge capacity of the negative electrode sheet obtained in the above test by the area of the negative electrode sheet, the charge capacity of the negative electrode sheet per unit area is obtained; and Total charge capacity of negative electrode sheet=Charge capacity of negative electrode sheet per unit area×Total area of negative electrode membrane in battery cell, where if the negative electrode sheet has a negative film layer on the upper and lower surfaces of a current collector, the total area of the negative electrode membrane is the sum of the area of the negative film layer on the upper and lower surfaces of the negative electrode sheet that participates in a charge and discharge reaction (usually, an area of a negative electrode membrane that participates in a charge and discharge reaction in a secondary battery is equal to a total area of a positive membrane).

In the present application, for example, when both the first-type battery cell and the second-type battery cell are of lithium-ion batteries, and the first-type battery cell and the second-type battery cell are in the same SOH and SOC, the ratio of the total charge capacity of the first negative electrode sheet of the first battery cell to the total charge capacity of the second negative electrode sheet of the second battery cell is within the above range, so that the negative electrode sheets of the first-type battery cell and the second-type battery cell have consistent ability to insert lithium ions (the amount of lithium ions that can be inserted), which can make life attenuation rates of the battery cells of different types of chemical systems basically the same during series use, and further significantly improves the overall cycle life of the battery module.

In some embodiments of the present application, when the battery state of health (SOH) of the first battery cell is the same as the SOH of the second battery cell, and the state of charge (SOC) of the first battery cell is the same as the SOC of the second battery cell, the ratio of the total charge capacity of the first negative electrode sheet to the total charge capacity of the second negative electrode sheet is 0.9 to 1.1. In the present application, when the ratio of the total charge capacity of the first negative electrode sheet of the first battery cell to the total charge capacity of the second negative electrode sheet of the second battery cell is within the above range, the ability of the negative electrode sheets of the first-type battery cell and the second-type battery cell to insert lithium ions (the amount of lithium ions that can be inserted) can be improved to be consistent, which can make life attenuation rates of the battery cells of different types of chemical systems consistent during the series connection use, and further improves the overall cycle life of the battery module.

In some embodiments of the present application, the first negative electrode sheet and the second negative electrode sheet further satisfy at least one of the following conditions:
(1) a ratio of a compacted density of the first negative electrode sheet to a compacted density of the second negative electrode sheet is 0.85 to 1.15, optionally, 0.95 to 1.05;
(2) a ratio of coating mass per unit area of the first negative electrode sheet to coating mass per unit area of the second negative electrode sheet is 0.85 to 1.15, optionally, 0.95 to 1.05; and
(3) a ratio of porosity of the first negative electrode sheet to porosity of the second negative electrode sheet is 0.8 to 1.25, optionally, 0.9 to 1.1.

In the present application, the compacted density of the negative electrode sheet refers to a density of a negative film layer on a single side surface of a negative current collector.

In the present application, when the ratio of the compacted density of the first negative electrode sheet to the compacted density of the second negative electrode sheet is further controlled within the above range, it can be ensured that the first battery cell and the second battery cell have good dynamics, and there are fewer side reactions on the surface of the negative electrode sheet, thereby further improving the kinetic performance and cycle life of the battery module.

In some embodiments of the present application, a compacted density of the first negative electrode sheet and a compacted density of the second negative electrode sheet are each independently 1.0 $g/cm^3$ to 1.9 $g/cm^3$, optionally, 1.2 $g/cm^3$ to 1.8 $g/cm^3$.

(About Test of Compacted Density)

In the present application, the compacted density of the negative electrode sheet can be measured by a method known in the art. As an example, the following method can be used for testing: taking a single-sided coated and cold-pressed negative electrode sheet (if it is a double-sided coated electrode sheet, a negative film layer on one side is wiped off first), or a negative electrode sheet obtained from the disassembly of a battery cell (the negative electrode sheet obtained from the disassembly of the battery cell can be simply rinsed with DMC to remove the residual electrolytic solution or reaction by-products on the surface of the electrode sheet and inside), and die-cutting it into a small disc with an area of S1 and weighing the small disc to be recorded as M1; testing a thickness of the negative film layer to be recorded as H; then wiping off the negative film layer and weighing the negative current collector to be recorded as M2. The compacted density of the negative film layer dc=(M1−M2)/S1/H.

In the present application, the coating mass per unit area of the negative electrode sheet refers to mass of a negative film layer provided on a single side surface of a negative current collector per unit area. In the present application, when the ratio of the coating mass per unit area of the first negative electrode sheet to the coating mass per unit area of the second negative electrode sheet is further controlled within the above range, since the amount of graphite in the negative electrode is equivalent, the number of active sites that can be inserted with lithium ions is equivalent, a rate of lithium ion film formation consumption and a rate of loss of active substances are equivalent, and an aging rate of the battery cell is relatively close, consistency of the overall performance of the battery module can be further improved.

In some embodiments of the present application, coating mass per unit area of the first negative electrode sheet and coating mass per unit area of the second negative electrode sheet are each independently 6 $mg/cm^2$ to 17 $mg/cm^2$, optionally, 8 $mg/cm^2$ to 14 $mg/cm^2$.

(About Test of Coating Mass Per Unit Area of Negative Electrode Sheet)

In the present application, the coating mass per unit area of the negative electrode sheet can be tested by a method known in the art. As an example, the following method can be used for testing:
leaving a battery cell at 25° C. for 30 minutes; performing discharging at a constant current of 0.33 C to an end-of-discharge voltage of the battery cell, standing for 30 minutes for full discharge, then disassembling the battery cell, and taking a negative electrode sheet to be tested (if it is a double-sided coated negative electrode sheet, an active substance layer on one side can be wiped off first), die-cutting it into a small disc with an area of S1, weighing the small disc and recording its mass as M1; then placing the negative electrode sheet in deionized water so that the negative active substance layer is completely peeled off from a negative current collector, and weighing the negative current collector and recording its mass as M2. Therefore, the coating mass per unit area of the negative electrode sheet can be calculated according to a formula: coating mass per unit area of negative electrode sheet=(M1−M2)/S1.

In the present application, the porosity of the negative electrode sheet refers to a proportion of a void volume of the negative electrode sheet with a negative film layer on the upper and lower surfaces of the negative current collector in a total volume thereof. In the present application, when the ratio of porosity of the first negative electrode sheet to porosity of the second negative electrode sheet is further controlled within the above range, since kinetic performance of the negative electrode sheet is equivalent, and a degree of side reactions is equivalent, consistency between charging, rate, and power performance of the battery cells is better, and a better life performance match can be achieved at the same time.

In some embodiments of the present application, porosity of the first negative electrode sheet and porosity of the second negative electrode sheet are each independently 15% to 35%, optionally, 20% to 30%.

(About Test of Porosity)

In the present application, the porosity of the negative electrode sheet refers to a ratio of a pore volume of the electrode sheet to a total volume, which can be obtained by testing in a method known in the art. As an example, the following method can be used for testing: for example, an AccuPyc II 1340 automatic true density tester from Micromeritics of the United States is adopted for testing with reference to the national standard GB/T 24586-2009.

Specific test steps are as follows: leaving a battery cell at 25° C. for 30 minutes; performing discharging at a constant current of 0.33 C to an end-of-discharge voltage of the battery cell, and then standing for 30 minutes; then disassembling the battery cell and taking out a negative electrode sheet; soaking the electrode sheet in DMC for 20 h, replacing the DMC once during the period, and airing for more than 2 h in a drying room to completely dry; and using a punching machine to punch more than 30 small discs with a diameter of 14 mm, where the small discs must have complete edges and no powder; using a 1/10 micrometer to measure the thickness for each piece at least once, taking an average value, performing ziplock bag packaging, and marking the thickness; and using a small molecule diameter inert gas (helium) replacement method, and accurately measuring a true volume of the measured material by combining Archimedes principle and Bohr's law. Porosity P=(V2−V1)/V2*100%, and apparent volume V2=S*H*A, where: S represents the area in unit of $cm^2$; H represents the thickness in unit of cm; A represents the number of samples in unit of EA; V1 represents the true volume of a sample in unit of $cm^3$ and obtained by the test; and V2 represents the apparent volume of the sample in unit of $cm^3$.

In some embodiments of the present application, a negative active substance of the first negative electrode sheet and a negative active substance of the second negative electrode sheet may be independently selected from one or more of artificial graphite, natural graphite, soft carbon, hard carbon, silicon-based materials, tin-based materials, and lithium titanate. Optionally, a gram capacity of the negative active substance of the first negative electrode sheet is the same as that of the negative active substance of the second negative electrode sheet. In the present application, when the negative active substance of the first negative electrode sheet and the negative active substance of the second negative electrode sheet have the same composition, the ability of the negative electrode sheets of the first-type battery cell and the second-type battery cell to insert lithium ions (the amount of lithium ions that can be inserted) can be better made to be consistent, so that life attenuation rates of the battery cells of different types of chemical systems during the series connection use are basically the same, and further the overall cycle life of the battery module is significantly improved.

In some embodiments of the present application, a ratio of a rated capacity of the first-type battery cell to a rated capacity of the second-type battery cell is 0.8 to 1.2, optionally, 0.9 to 1.1. In the present application, on the basis of controlling the relationship between total charge capacities of the first negative electrode sheet and the second negative electrode sheet, when the rated capacities of the first battery cell and the second battery cell are further controlled within the above range, the capacity of the module is not affected by the shortcoming of a single battery cell capacity due to better consistency of battery cell capacities in the hybrid series module, and therefore energy throughput of the module can be improved.

In the present application, the rated capacity of the first battery cell and the rated capacity of the second battery cell can be tested using a method known in the art, or can be based on a battery cell capacity identified in a GBT certification document of the battery cell, or a battery module to which the battery cell belongs, or a battery pack to which the battery cell belongs.

In some embodiments of the present application, a ratio of the number of first-type battery cells to the number of second-type battery cells is 0.1 to 50, optionally, 1 to 30.

In the battery module of the present application, the first-type battery cell and the second-type battery cell are electrically connected, so as to output electric energy or store electric energy at the required voltage and current. The first-type battery cell and the second-type battery cell may be electrically connected in series or a series-parallel combination. In the present application, when the first-type battery cell and the second-type battery cell are electrically connected at least in series, the first-type battery cell and the second-type battery cell can be charged/discharged synchronously, which is convenient to realize the consistency of capacity attenuation characteristics of the battery cells of different chemical systems in the battery module, and is conducive to achieving the longer cycle life of the battery module. In a specific example, the electrical connection mode of the first-type battery cell and the second-type battery cell is series connection.

In some embodiments of the present application, the electrical connection mode of the first-type battery cell and the second-type battery cell further includes parallel connection. In the present application, the parallel connection of the first-type battery cell and the second-type battery cell can be that a plurality of first-type battery cells and second-type battery cells are first connected in series to form sub-modules, and then on this basis, two or more sub-modules having the same total voltage are connected in parallel. This can further increase the external output current of the battery module.

[Manufacturing Method]

Another aspect of the present application provides a manufacturing method of a battery module, including the following steps: obtaining a first-type battery cell and a second-type battery cell, where the first-type battery cell and the second-type battery cell are battery cells of different chemical systems, the first-type battery cell includes N first battery cell(s), and the second-type battery cell includes M second battery cell(s), where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2; and electrically connecting the first-type battery cell and the second-type battery cell in a manner including series connection to form the battery module as described above.

The battery module obtained by adopting the manufacturing method of the present application can ensure that life attenuation rates of battery cells of different chemical systems during long-term use are as close as possible, thereby avoiding the short life of a certain type of battery cell in the hybrid series module, and significantly improving the overall cycle life of the module.

The technical features of the battery module in the present application are also applicable to the manufacturing method of the battery module, and produce the corresponding beneficial effects.

Both the first-type battery cell and the second-type battery cell can be obtained commercially or prepared by a method known in the art. As an example, a positive electrode sheet, a separator and a negative electrode sheet can form a battery cell through a lamination process or a winding process; the battery cell is packaged in an outer package, an electrolytic solution is injected, and after subsequent processes such as packaging, the battery cell is obtained.

The positive electrode sheet can be prepared according to conventional methods in the art. For example, a positive active substance, a conductive agent and a binder are dispersed in a solvent to form a uniform positive slurry, and the solvent is N-methylpyrrolidone (NMP) for example; and the positive slurry is coated on a positive current collector, and after drying, cold pressing and other processes, the positive electrode sheet is obtained.

The negative electrode sheet can be prepared according to conventional methods in the art. For example, a negative active substance, a conductive agent, a binder, and a thickener are dispersed in a solvent to form a uniform negative slurry, and the solvent is deionized water for example; and the negative slurry is coated on a negative current collector, and after drying, cold pressing and other processes, the negative electrode sheet is obtained.

[Manufacturing Device]

Another aspect of the present application provides a manufacturing device of a battery module, including: a clamping arm unit configured to obtain a first-type battery cell and a second-type battery cell, where the first-type battery cell and the second-type battery cell are battery cells of different chemical systems, the first-type battery cell includes N first battery cell(s), and the second-type battery cell includes M second battery cell(s), where N and M are positive integers; and when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2; an assembling unit configured to electrically connect the first-type battery cell and the second-type battery cell in a manner including series connection to form the battery module as described above; and a control unit configured to control the clamping arm unit and the assembling unit.

[Battery Pack]

Another aspect of the present application further provides a battery pack including any one or several battery modules of the present application. The number of battery modules included in the battery pack may be adjusted according to the application and capacity of the battery pack. Optionally, the battery pack may further include auxiliary components such as a battery management system (BMS) module and cooling/heating components.

In some embodiments, the battery pack includes more than two battery modules, and each battery module is the battery module described in the present application. The battery pack has higher safety, and meanwhile, capacity attenuation trends of battery cells of different chemical systems are basically the same, and thus its cycle life can be significantly improved.

Figure 4:
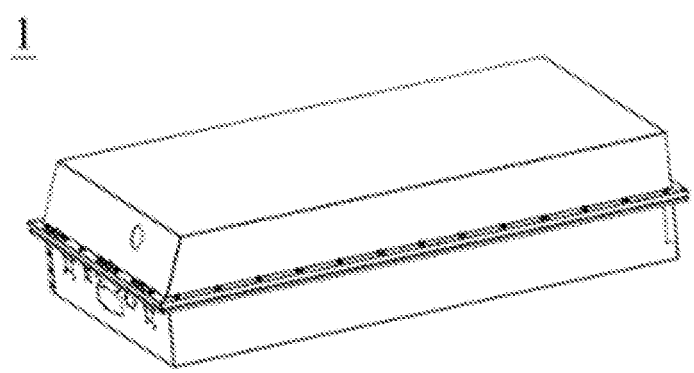
FIG. 4 is a schematic diagram showing an example of a battery pack of the present application.
Figure 5:
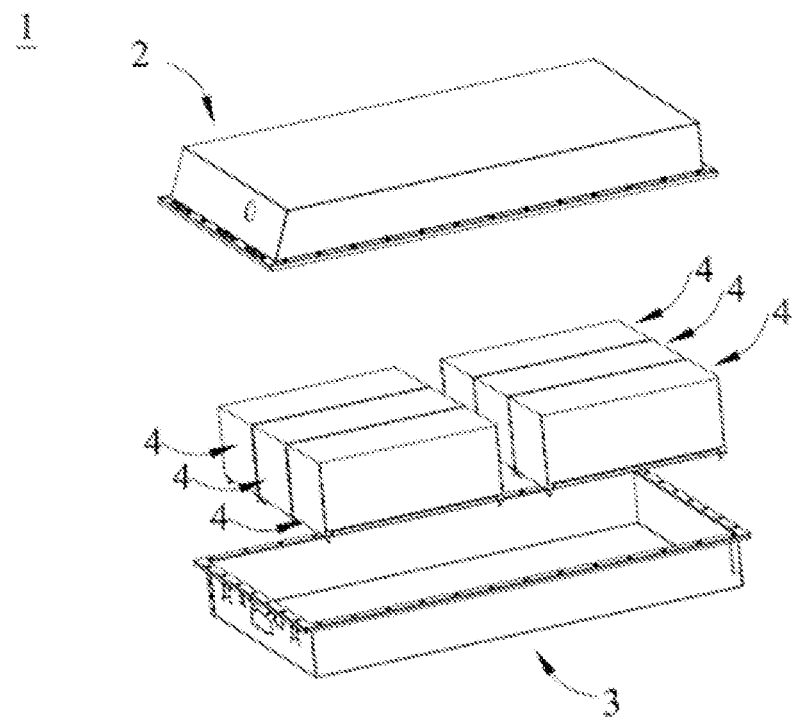
FIG. 5 is an exploded view showing an example of the battery pack of the present application shown in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box 2 and a lower box 3. The upper box 2 can cover the lower box 3 to form an enclosed space for accommodating the battery modules 4. The plurality of battery modules 4 may be arranged in the battery box in any manner.

[Power Consumption Apparatus]

Another aspect of the present application further provides a power consumption apparatus including the battery module or the battery pack described in the present application. The battery module or the battery pack may be used as a power supply of the power consumption apparatus to provide power to the power consumption apparatus, or may also be used as an energy storage unit of the power consumption apparatus. The power consumption apparatus may be, but is not limited to, a mobile device (such as a mobile phone, a circletop, or the like), an electric vehicle (such as a pure electric vehicle, a hybrid electric vehicle, a plug-in hybrid electric vehicle, an electric bicycle, an electric scooter, an electric golf cart, an electric truck, or the like), an electric train, a ship and a satellite, an energy storage system, or the like. The power consumption apparatus may select an electrochemical apparatus such as a battery module or a battery pack according to its usage requirements.

Figure 6:
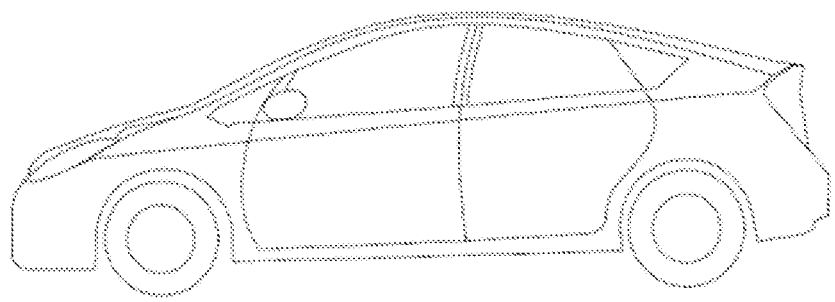
FIG. 6 is a schematic diagram showing an example of a power consumption apparatus using a battery module of the present application as a power supply.

FIG. 6 shows a power consumption apparatus as an example. The power consumption apparatus is a pure electric vehicle, a hybrid electric vehicle, or a plug-in hybrid electric vehicle, or the like. The power consumption apparatus may adopt a battery pack or a battery module.

EXAMPLES

Hereinafter, the technical solution of the present application and its advantages are described in detail through specific examples.

Battery Cell Preparation

With reference to GB/T 31484-2015 Cycle Life Requirements and Test Methods for Traction Battery of Electric Vehicle, a preparation method of a battery cell in each example and comparative example is as follows.

1. Preparation of Positive Slurry

A positive electrode material, a conducting carbon (Super P), and a binder (polyvinylidene fluoride (PVDF)) are fully stirred and mixed in an appropriate amount of N-methylpyrrolidone (abbreviated as NMP) solvent at a weight ratio of 95:3:2 to form a uniform and stable slurry with a viscosity of 10000 mPa·s, and the slurry will not be gelled, stratified or settled within 24 hours.

2. Preparation of Positive Electrode Sheet

The positive material slurry is uniformly coated on a positive current collector (Al foil), and after drying, an electrode sheet is cold pressed to a designed compacted density and divided into strips for later use, and thus a positive electrode sheet is obtained.

3. Preparation of Electrolytic Solution

An equal volume of ethylene carbonate is dissolved in propylene carbonate, and then lithium hexafluorophosphate is uniformly dissolved in the mixed solvent (the concentration of lithium hexafluorophosphate is 1.0 M/L) for later use to obtain an electrolytic solution.

4. Preparation of Negative Electrode Sheet

A negative active material such as graphite and conducting carbon, a binder (polystyrene butadiene copolymer (SBR)), a thickener (sodium carboxymethyl cellulose (CMC)) are fully stirred and mixed in an appropriate amount of water solvent at a weight ratio of 95:2:2:1 to form a uniform negative stable slurry; the slurry is uniformly coated on a negative current collector (Cu foil), and after drying, an electrode sheet is cold pressed to a designed compacted density, and divided into strips for later use.

5. Separator

PE is selected as a separator.

6. Preparation of Battery Cell

A conventional preparing process of a battery cell is adopted. A positive electrode sheet, a separator and a negative electrode sheet are wound together to form a bare battery cell, then placed in a housing of the battery cell, and injected with the electrolytic solution, and then processes such as forming and sealing are carried out to obtain a final rechargeable power battery cell.

Assembly of Battery Module

A first-type battery cell and a second-type battery cell are electrically connected in series in a battery module. The first-type battery cell and the second-type battery cell are battery cells of different chemical systems. The first-type battery cell includes six first battery cells, and the second-type battery cell includes three second battery cells, all of which are arranged in a BAAABAAAB manner (A represents the first battery cell, and B represents the second battery cell).

Test Methods of Battery Cell and Battery Module

1. Test Method of SOH of First Battery Cell and Second Battery Cell

Referring to testing an actual capacity of a battery cell in GB/T 31484-2015 Cycle Life Requirements and Test Methods for Traction Battery of Electric Vehicle, a ratio of an actual capacity measured using the same test procedure to a rated capacity of a freshly shipped battery cell is SOH.

Test Steps of Actual Capacity (recorded as: Capx):

1) leaving a battery cell to be tested at 25° C. for 30 minutes; 2) performing discharging at a constant current of 0.33 C (C represents a rated capacity of the battery cell, where a charging/discharging current is a rate multiplied by the rated capacity of the battery cell, and the rated capacity is based on a battery cell capacity identified in a GBT certification document of the battery cell, or a battery module to which the battery cell belongs, or a battery pack to which the battery cell belongs) to an end-of-discharge voltage of the battery cell, and then standing for 30 minutes; 3) performing charging at a constant current of 0.33 C to an end-of-charge voltage of the battery cell, performing charging at a constant voltage until the current is <0.05 C, and standing for 5 minutes; and 4) performing discharging at a constant current of 0.33 C to an end-of-discharge voltage of the battery cell, and then standing for 5 minutes. A discharge capacity tested from step 3) to step 4) is recorded as Capx.

The percentage of Capx in the rated capacity C is SOH.

2. Test Method of SOC of First Battery Cell and Second Battery Cell

Referring to testing a capacity that can be released by a battery cell under the same discharge conditions as the rated capacity test procedure in GB/T 31484-2015 Cycle Life Requirements and Test Methods for Traction Battery of Electric Vehicle, the discharge capacity is recorded as Capy, and the percentage of the capacity to the actual capacity Capx of the battery cell is the SOC.

3. Test Method of Total Charge Capacities of Negative Electrode Sheets of First Battery Cell and Second Battery Cell (1) Electrode sheet sampling requirements are as follows:

Taking a single-sided coated and cold-pressed negative electrode sheet (if it is a double-sided coated electrode sheet, a negative film layer on one side is wiped off first), or a negative electrode sheet obtained from the disassembly of a battery cell (leaving a battery cell at 25° C. for 30 minutes; performing discharging at a constant current of 0.33 C to an end-of-discharge voltage of the battery cell, standing for 30 minutes for full discharge, then disassembling the battery cell, and taking out a negative electrode sheet, where if it is a double-sided coated electrode sheet, a negative film layer on one side is wiped off first, rinsed with DMC solution appropriately, and dried for later use); and using a ruler to measure length and width of the negative electrode sheet, where an area of the negative electrode sheet is equal to the product of the length and the width, and a sampling position of the negative electrode sheet is: selected to be any position in the middle from the edge >15 mm;

(2) Assembling a coin-type half cell by using the side of the negative electrode sheet with the negative film layer and a lithium sheet as counter electrodes; and (3) A charge capacity of the negative electrode sheet per unit area, and a total charge capacity of the negative electrode sheet:

where a test voltage is 0.05-2.0V, a test temperature is 25° C., and a charging/discharging rate is 0.1 C; no less than ten parallel samples are taken to test a charge capacity of the button-type half cell respectively; by removing the minimum and maximum values and taking an average value, the charge capacity of the negative electrode sheet under the area is obtained; and by dividing the charge capacity of the negative electrode sheet obtained in the above test by the area of the negative electrode sheet, the charge capacity of the negative electrode sheet per unit area is obtained; and Total charge capacity of negative electrode sheet=Charge capacity of negative electrode sheet per unit area×Total area of negative electrode membrane in battery cell, where if the negative electrode sheet has a negative film layer on the upper and lower surfaces of a current collector, the total area of the negative electrode membrane is the sum of the area of the negative film layer on the upper and lower surfaces of the negative electrode sheet that participates in a charge and discharge reaction (usually, an area of a negative electrode membrane that participates in a charge and discharge reaction in a secondary battery is equal to a total area of a positive membrane).

4. Test Method of Capacities of First Battery Cell and Second Battery Cell:

A battery to be tested is selected, a battery cell charging and discharging machine and a high and low temperature box are used to test a charge capacity and a discharge capacity of the battery cell till full charge at a standard rate at 25° C., and the discharge capacity is the capacity of the battery cell. A charging-discharging rate is 0.33 C (C represents a rated capacity of the battery cell, where a charging/discharging current is the rate multiplied by a rated capacity of the battery cell, and the rated capacity is based on a battery cell capacity identified in a GBT certification document of the battery cell).

Specifically, a test procedure for a capacity of a battery cell is as follows: 1) standing for 30 minutes at 25° C.; 2) performing discharging at a constant current of 0.33 C to an end-of-discharge voltage (for example, for a battery cell of an NCM chemical system, it is set as 2.8V, and for a battery cell of an LFP chemical system, it is set as 2.5V), and then standing for 30 minutes; 3) performing charging at a constant current of 0.33 C to an end-of-charge voltage (for example, for a battery cell of an NCM chemical system, it is set as 4.2V, 4.25V, 4.3V, 4.35V, 4.4V, 4.45V, and the like according to the specific battery cell type, and for a battery cell of an LFP chemical system, it is generally set as 3.65V, and the end-of-charge voltage of the battery cell is recognized as known information in the field), performing charging at a constant voltage until the current is <0.05 C, and then standing for 5 minutes; 4) performing discharging at a constant current of 0.33 C to an end-of-discharge voltage. At this time, the tested discharge capacity is a capacity value of the battery cell. For related terms and test methods, refer to GB/T 19596, GB/T 31484-2015, GB/T 31485-2015, GB/T 31486-2015 and Safety Requirements for Traction Battery of Electric Vehicle.

5. Test Method of Capacity Retention Rate of Battery Module:

Reference is made to GB/T 31484-2015 Cycle Life Requirements and Test Methods for Traction Battery of Electric Vehicle.

(1) Test Method of Capacity Retention Rate for 1000 Cycles (/25° C.):

Test Steps of Initial Capacity (recorded as: Cap0):

1) leaving a freshly shipped battery module at 25° C. for 30 minutes; 2) performing discharging at a constant current of 0.33 C (C represents a rated capacity of a battery cell, where a charging/discharging current is a rate multiplied by the rated capacity of the battery cell, and the rated capacity is based on a battery cell capacity identified in a GBT certification document of the battery cell, or a battery module to which the battery cell belongs, or a battery pack to which the battery cell belongs) to an end-of-discharge voltage of the battery module, and then standing for 30 minutes; 3) performing charging at a constant current of 0.33 C to an end-of-charge voltage of the battery module, performing charging at a constant voltage until the current is <0.05 C, and standing for 5 minutes; 4) performing discharging at a constant current of 0.33 C to an end-of-discharge voltage of the battery module, and then standing for 5 minutes. A discharge capacity tested from step 3) to step 4) is recorded as Cap0.

Step 1)-Step 4) are a charge and discharge cycle of the battery module.

The above steps 1) to 4) are repeated 1000 times, a discharge capacity tested at the 1000th time is recorded as Capn, and a capacity retention rate at the 1000th time is: Capn/Cap0*100%.

Through the above battery cell preparation method, a battery module of Example 1 and a battery module of Comparative Example 1 can be obtained as follows. In the battery module of Example 1 and the battery module of Comparative Example 1, a capacity of a negative electrode of a second-type battery cell (a capacity of a second-type battery cell) differs from each other.

In addition, by the above test method, the following Table 1 showing comparison results between Example 1 and Comparative Example 1 can be obtained.

TABLE 1

|  | Example 1 | Example 2 | Comparative Example 1 | Comparative Example 2 |
| --- | --- | --- | --- | --- |
| Positive active substance of first battery cell | LiFePO$_4$ | LiFePO$_4$ | LiFePO$_4$ | LiFePO$_4$ |
| Positive active substance of second battery cell | LiNi$_{0.82}$Co$_{0.10}$Mn$_{0.08}$O$_2$ | LiNi$_{0.82}$Co$_{0.10}$Mn$_{0.08}$O$_2$ | LiNi$_{0.82}$Co$_{0.10}$Mn$_{0.08}$O$_2$ | LiNi$_{0.82}$Co$_{0.10}$Mn$_{0.08}$O$_2$ |
| Total charge capacity of first negative electrode sheet when first battery cell is at 100% SOH and 0% SOC [Ah] | 107 | 107 | 107 | 107 |
| Total charge capacity of second negative electrode sheet when second battery cell is at 100% SOH and 0% SOC [Ah] | 134 | 89 | 138 | 82 |
| Ratio of total charge capacities of first negative electrode sheet and second negative electrode sheet | 80% | 120% | 78% | 130% |
| Rated capacity of first battery cell [Ah] | 100 | 100 | 100 | 100 |
| Rated capacity of second battery cell [Ah] | 125 | 83 | 129 | 77 |
| Number of first battery cell N | 6 | 11 | 4 | 4 |
| Number of second battery cell M | 3 | 2 | 5 | 9 |
| Ratio of rated capacities of first battery cell and second battery cell | 80% | 120% | 78% | 130% |
| Discharge capacity of negative electrode sheet of first battery cell at the 1000th circle [Ah] | 106 | 106 | 106 | 105 |
| Discharge capacity of negative electrode sheet of second battery cell at the 1000th circle [Ah] | 132 | 88 | 136 | 80 |
| Ratio of discharge capacities of negative electrode sheets at the 1000th circle | 80% | 120% | 78% | 131% |

TABLE 1-continued

|  | Example 1 | Example 2 | Comparative Example 1 | Comparative Example 2 |
|---|---|---|---|---|
| Capacity retention rate of battery module at the 1000th cycle | 89% | 90% | 83% | 78% |

According to the above Table 1, in Comparative Example 1, when a ratio of a total charge capacity of a first negative electrode sheet to a total charge capacity of a second negative electrode sheet is 0.78, that is, less than 0.8 (not within the range of 0.8 to 1.2), and other conditions are exactly the same, a capacity retention rate of a battery module at the 1000th circle significantly decreases as compared with Examples 1 and 2. In Comparative Example 2, when a ratio of a total charge capacity of a first negative electrode sheet to a total charge capacity of a second negative electrode sheet is 1.3, that is, exceeding 1.2 (not within the range of 0.8 to 1.2), and other conditions are exactly the same, a capacity retention rate of a battery module at the 1000th circle also significantly decreases as compared with Examples 1 and 2.

It can be seen from this that, compared with Comparative Examples, Examples 1 and 2 of the present application can increase the capacity retention rate of the battery module at the 1000th circle by ensuring that the total charge capacities of the negative electrode sheets of the first battery cell and the second battery cell are within a certain range under the same SOH and SOC, and significantly improves the overall cycle life of the battery module.

<About Design of Compacted Density>

In the present application, optionally, a ratio of a compacted density of the first negative electrode sheet to a compacted density of the second negative electrode sheet is 0.85 to 1.15. Optionally, the ratio of the compacted density of the first negative electrode sheet to the compacted density of the second negative electrode sheet is 0.95 to 1.05. Optionally, the compacted density of the first negative electrode sheet and the compacted density of the second negative electrode sheet are both in the range of 1.0 $g/cm^3$ to 1.9 $g/cm^3$. Optionally, the compacted density of the first negative electrode sheet and the compacted density of the second negative electrode sheet are both in the range of 1.2 $g/cm^3$ to 1.8 $g/cm^3$.

The inventors of the present application have discovered through painstaking research that when the compacted density of the negative electrode sheet is within an appropriate range, porosity of the negative electrode sheet is moderate, thereby improving the interface side reaction between the negative electrode sheet and the electrolytic solution, suppressing the consumption of the electrolytic solution and negative electrode active layer materials, and effectively improving the cycle life of the battery cell; and moreover, since a total volume of pores to be filled in the negative electrode sheet is moderate, there is no need to use too much electrolytic solution, which is beneficial to improving the energy density of the battery cell.

In the present application, by making the compacted density of the first negative electrode sheet consistent with the compacted density of the second negative electrode sheet as much as possible, life attenuation rates of the two types of battery cells during use can be enabled basically consistent, and overall life and overall performance of the battery module can be significantly improved.

Hereinafter, the technical solution of the present application and its advantages are described in detail through specific embodiments.

Battery Cell Preparation

Regarding the preparation of a battery cell, a method similar to the Battery Cell Preparation of the above Example 1 is adopted, except that the compacted density is changed into values shown in the following Examples 3-10.

Test Method of Compacted Density

The compacted density can be tested using a method known in the art. An exemplary test method of the compacted density of the negative film layer is as follows: taking a single-sided coated and cold-pressed negative electrode sheet (if it is a double-sided coated electrode sheet, a negative film layer on one side is wiped off first), and die-cutting it into a small disc with an area of Si weighing the small disc to be recorded as M1; testing a thickness of the negative film layer to be recorded as H; then wiping off the negative film layer and weighing the negative current collector to be recorded as M2. The compacted density of the negative film layer dc=(M1−M2)/S1/H.

Through the above Battery Cell Preparation method, battery modules of Examples 3-10 can be obtained as follows. In battery modules of Examples 3-6, a compacted density of a negative electrode sheet of a first-type battery cell is the same, but a compacted density of a negative electrode sheet of a second-type battery cell differs from each other. In battery modules of Examples 7-10, a ratio of a compacted density of a negative electrode sheet of a first-type battery cell to a compacted density of a negative electrode sheet of a second-type battery is the same, but compacted densities of the negative electrode sheet of the first-type battery cell are different from each other, and compacted densities of the negative electrode sheets of the second-type battery cell are different from each other.

In addition, through the above test method, the following Table 2 showing comparison results between Examples 3-6 can be obtained.

TABLE 2

|  | Example 3 | Example 4 | Example 5 | Example 6 |
|---|---|---|---|---|
| Positive active substance of first battery cell | LiFePO$_4$ | LiFePO$_4$ | LiFePO$_4$ | LiFePO$_4$ |
| Positive active substance of second battery cell | LiNi$_{0.65}$Co$_{0.07}$Mn$_{0.28}$O$_2$ | LiNi$_{0.65}$Co$_{0.07}$Mn$_{0.28}$O$_2$ | LiNi$_{0.65}$Co$_{0.07}$Mn$_{0.28}$O$_2$ | LiNi$_{0.65}$Co$_{0.07}$Mn$_{0.28}$O$_2$ |
| Total charge capacity of first negative electrode sheet when first battery cell is at 100% SOH and 0% SOC [Ah] | 107 | 107 | 107 | 107 |

TABLE 2-continued

|  | Example 3 | Example 4 | Example 5 | Example 6 |
|---|---|---|---|---|
| Total charge capacity of second negative electrode sheet when second battery cell is at 100% SOH and 0% SOC [Ah] | 107 | 107 | 107 | 107 |
| Ratio of total charge capacities of first negative electrode sheet and second negative electrode sheet | 100% | 100% | 100% | 100% |
| Rated capacity of first battery cell [Ah] | 100 | 100 | 100 | 100 |
| Rated capacity of second battery cell [Ah] | 100 | 100 | 100 | 100 |
| Ratio of rated capacities of first battery cell and second battery cell | 100% | 100% | 100% | 100% |
| Compacted density of first negative electrode sheet [g/cm$^3$] | 1.36 | 1.36 | 1.36 | 1.36 |
| Compacted density of second negative electrode sheet [g/cm$^3$] | 1.60 | 1.18 | 1.65 | 1.15 |
| Ratio of compacted densities | 85% | 115% | 82% | 118% |
| Coating mass per unit area of first negative electrode [mg/cm$^2$] | 11.0 | 11.0 | 11.0 | 11.0 |
| Coating mass per unit area of second negative electrode [mg/cm$^2$] | 11.0 | 11.0 | 11.0 | 11.0 |
| Ratio of coating mass | 100% | 100% | 100% | 100% |
| Discharge capacity of negative electrode sheet of first battery cell at the 1000th circle [Ah] | 105 | 105 | 105 | 104 |
| Discharge capacity of negative electrode sheet of second battery cell at the 1000th circle [Ah] | 105 | 105 | 104 | 104 |
| Ratio of discharge capacities of negative electrode sheets at the 1000th circle | 101% | 101% | 100% | 100% |
| Capacity retention rate of battery module at the 1000th cycle | 93% | 90% | 86% | 84% |

According to the above Table 2, when a ratio of a compacted density of a first negative electrode sheet to a compacted density of a second negative electrode sheet is 0.82 or 1.18, that is, less than 0.85 or greater than 1.15 (not within the range of 0.85 to 1.15), and other conditions are exactly the same (Comparative Examples 2 and 3), a capacity retention rate of a battery module at the 1000th circle significantly decreases as compared with of Examples 3 and 4.

It can be seen from this that, compared with Examples 5 and 6, Examples 3 and 4 of the present application can increase the capacity retention rate of of the battery module at the 1000th circle, and can significantly improve the overall life and overall performance of the battery module.

In addition, through the above test method, the following Table 3 showing comparison results between Examples 7-10 can be obtained.

TABLE 3

|  | Example 7 | Example 8 | Example 9 | Example 10 |
|---|---|---|---|---|
| Positive active substance of first battery cell | LiFePO$_4$ | LiFePO$_4$ | LiFePO$_4$ | LiFePO$_4$ |
| Positive active substance of second battery cell | LiNi$_{0.70}$Co$_{0.10}$Mn$_{0.20}$O$_2$ | LiNi$_{0.70}$Co$_{0.10}$Mn$_{0.20}$O$_2$ | LiNi$_{0.70}$Co$_{0.10}$Mn$_{0.20}$O$_2$ | LiNi$_{0.70}$Co$_{0.10}$Mn$_{0.20}$O$_2$ |
| Total charge capacity of first negative electrode sheet when first battery cell is at 100% SOH and 0% SOC [Ah] | 105 | 105 | 105 | 105 |
| Total charge capacity of second negative electrode sheet when second battery cell is at 100% SOH and 0% SOC [Ah] | 107 | 107 | 107 | 107 |
| Ratio of total charge capacities of first negative electrode sheet and second negative electrode sheet | 90% | 90% | 90% | 90% |
| Rated capacity of first battery cell [Ah] | 100 | 100 | 100 | 100 |
| Rated capacity of second battery cell [Ah] | 111 | 111 | 111 | 111 |
| Ratio of rated capacities of first battery cell and second battery cell | 90% | 90% | 90% | 90% |
| Compacted density of first negative electrode sheet [g/cm$^3$] | 1.00 | 1.90 | 0.95 | 1.95 |
| Compacted density of second negative electrode sheet [g/cm$^3$] | 1.00 | 1.90 | 0.95 | 1.95 |
| Ratio of compacted densities | 100% | 100% | 100% | 100% |
| Coating mass per unit area of first negative electrode [mg/cm$^2$] | 14.0 | 14.0 | 14.0 | 14.0 |
| Coating mass per unit area of second negative electrode [mg/cm$^2$] | 14.0 | 14.0 | 14.0 | 14.0 |
| Ratio of coating mass | 100% | 100% | 100% | 100% |
| Discharge capacity of negative electrode sheet of first battery cell at the 1000th circle [Ah] | 103 | 103 | 103 | 103 |

TABLE 3-continued

|  | Example 7 | Example 8 | Example 9 | Example 10 |
|---|---|---|---|---|
| Discharge capacity of negative electrode sheet of second battery cell at the 1000th circle [Ah] | 114 | 114 | 114 | 113 |
| Ratio of discharge capacities of negative electrode sheets at the 1000th circle | 91% | 90% | 90% | 90% |
| Capacity retention rate of battery module at the 1000th cycle | 90% | 88% | 85% | 84% |

According to the above Table 3, when a compacted density of a first negative electrode sheet (a compacted density of a second negative electrode sheet) is 0.95 or 1.95, that is, less than 1 or greater than 1.9 (not within the range of 1 to 1.9), and other conditions are exactly the same (Examples 9 and 10), a capacity retention rate of a battery module at the 1000th circle decreases as compared with Examples 7 and 8.

It can be seen from this that, compared with Examples 9 and 10, Examples 7 and 8 of the present application can increase the capacity retention rate of the battery module at the 1000th circle, and can further improve the overall life and overall performance of the battery module.

<About Design of Coating Mass>

In the present application, optionally, a ratio of coating mass per unit area of a negative active substance of the first negative electrode sheet to coating mass per unit area of a negative active substance of the second negative electrode sheet is 0.85 to 1.15; optionally, the ratio of the coating mass per unit area of the negative active substance of the first negative electrode sheet to the coating mass per unit area of the negative active substance of the second negative electrode sheet is 0.95 to 1.05; optionally, the coating mass per unit area of the negative active substance of the first negative electrode sheet and the coating mass per unit area of the negative active substance of the second negative electrode sheet are both in the range of 6 mg/cm$^2$ to 17 mg/cm$^2$; optional, the coating mass per unit area of the negative active substance of the first negative electrode sheet and the coating mass per unit area of the negative active substance of the second negative electrode sheet are both in the range of 8 mg/cm$^2$ to 14 mg/cm$^2$.

The inventors of the present application have found through painstaking research that the coating mass of the active substance layer of the negative electrode sheet needs to be controlled within an appropriate range. On the one hand, thickness of the active substance layer can be controlled, uniformity of internal reaction of the negative active substance layer can be improved, polarization of the active substance layer can be reduced, and power performance of the battery cell is improved; and on the other hand, it can ensure that energy densities of the battery cell and the module are high, and manufacturing costs of the battery cell per watt hour are reduced.

In the present application, by making the coating mass per unit area of the negative active substance of the first negative electrode sheet consistent with the coating mass per unit area of the negative active substance of the second negative electrode sheet as much as possible, life attenuation rates of the two types of battery cells during use can be enabled basically the same, and overall life and overall performance of the battery module can be significantly improved.

Hereinafter, the technical solution of the present application and its advantages are described in detail through specific embodiments.

Battery Cell Preparation

Regarding the preparation of a battery cell, a method similar to the Battery Cell Preparation of the above Example 1 is adopted, except that the coating mass per unit area of the negative active substance is changed into values shown in the following Examples 11-18.

Test Method of Coating Mass Per Unit Area of Negative Active Substance

A negative electrode sheet to be tested (if it is a double-sided coated negative electrode sheet, an active substance layer on one side can be wiped off first) is taken, die-cutted into a small disc with an area of S1, and the small disc is weighed to be recorded as M1; then the active substance layer on the surface of the electrode sheet is soaked in a solvent so that the negative active substance layer is completely peeled off from a negative current collector, and the negative current collector is weighed to be recorded as M2. Therefore, the coating mass per unit area of the negative electrode sheet can be calculated according to a formula: coating mass per unit area of negative electrode sheet=(M1−M2)/S1.

Through the above Battery Cell Preparation method, the following battery modules of Examples 11-18 can be obtained. In the battery modules of Examples 11-14, coating mass per unit area of a negative active substance of a negative electrode sheet of a first-type battery cell is the same, but coating mass per unit area of a negative active substance of a negative electrode sheet of a second-type battery cell differs from each other. In the battery modules of Examples 15-18, a ratio of coating mass per unit area of a negative active substance of a negative electrode sheet of a first-type battery cell to coating mass per unit area of a negative active substance of a negative electrode sheet of a second-type battery cell is the same, but the coating mass per unit area of the negative active substance of the negative electrode sheet of the first-type battery cell differs from each other, and the coating mass per unit area of the negative active substance of the negative electrode sheet of the second-type battery cell differs from each other.

In addition, by the above test method, the following Table 4 showing comparison results between Examples 11-14 can be obtained.

TABLE 4

|  | Example 11 | Example 12 | Example 13 | Example 14 |
|---|---|---|---|---|
| Positive active substance of first battery cell | LiFePO$_4$ | LiFePO$_4$ | LiFePO$_4$ | LiFePO$_4$ |
| Positive active substance of second battery cell | LiNi$_{0.55}$Co$_{0.12}$Mn$_{0.33}$O$_2$ | LiNi$_{0.55}$Co$_{0.12}$Mn$_{0.33}$O$_2$ | LiNi$_{0.55}$Co$_{0.12}$Mn$_{0.33}$O$_2$ | LiNi$_{0.55}$Co$_{0.12}$Mn$_{0.33}$O$_2$ |

TABLE 4-continued

|  | Example 11 | Example 12 | Example 13 | Example 14 |
| --- | --- | --- | --- | --- |
| Total charge capacity of first negative electrode sheet when first battery cell is at 100% SOH and 0% SOC [Ah] | 104.5 | 104.5 | 104.5 | 104.5 |
| Total charge capacity of second negative electrode sheet when second battery cell is at 100% SOH and 0% SOC [Ah] | 104 | 104 | 104 | 104 |
| Ratio of total charge capacities of first negative electrode sheet and second negative electrode sheet | 100% | 100% | 100% | 100% |
| Rated capacity of first battery cell [Ah] | 100 | 100 | 100 | 100 |
| Rated capacity of second battery cell [Ah] | 104 | 104 | 104 | 104 |
| Ratio of rated capacities of first battery cell and second battery cell | 96% | 96% | 96% | 96% |
| Compacted density of first negative electrode sheet [g/cm$^3$] | 1.34 | 1.34 | 1.34 | 1.34 |
| Compacted density of second negative electrode sheet [g/cm$^3$] | 1.34 | 1.34 | 1.34 | 1.34 |
| Ratio of compacted densities | 100% | 100% | 100% | 100% |
| Coating mass per unit area of first negative electrode [mg/cm$^2$] | 10.0 | 10.0 | 10.0 | 10.0 |
| Coating mass per unit area of second negative electrode [mg/cm$^2$] | 11.8 | 8.7 | 12.0 | 8.5 |
| Ratio of coating mass | 85% | 115% | 83% | 118% |
| Discharge capacity of negative electrode sheet of first battery cell at the 1000th circle [Ah] | 103 | 103 | 103 | 103 |
| Discharge capacity of negative electrode sheet of second battery cell at the 1000th circle [Ah] | 102 | 102 | 102 | 102 |
| Ratio of discharge capacities of negative electrode sheets at the 1000th circle | 101% | 101% | 101% | 101% |
| Capacity retention rate of battery module at the 1000th cycle | 95% | 95% | 91% | 91% |

According to the above Table 4, when a ratio of coating mass per unit area of a negative active substance of a first negative electrode sheet to coating mass per unit area of a negative active substance of a second negative electrode sheet is 0.83 or 1.18, that is, less than 0.85 or greater than 1.15 (not within the range of 0.85 to 1.15), and other conditions are exactly the same (Examples 13, 14), a capacity retention rate of a battery module at the 1000th cycle decrease as compared with Examples 11 and 12.

It can be seen from this that, compared with Examples 13 and 14, Examples 11 and 12 of the present application can increase the capacity retention rate of the battery module at the 1000th cycle, and can significantly improve the overall life and overall performance of the battery module.

In addition, by the above test method, the following Table 5 showing comparison results between Examples 15-18 can be obtained.

TABLE 5

|  | Example 15 | Example 16 | Example 17 | Example 18 |
| --- | --- | --- | --- | --- |
| Positive active substance of first battery cell | LiFePO$_4$ | LiFePO$_4$ | LiFePO$_4$ | LiFePO$_4$ |
| Positive active substance of second battery cell | LiNi$_{0.50}$Co$_{0.15}$Mn$_{0.35}$O$_2$ | LiNi$_{0.50}$Co$_{0.15}$Mn$_{0.35}$O$_2$ | LiNi$_{0.50}$Co$_{0.15}$Mn$_{0.35}$O$_2$ | LiNi$_{0.50}$Co$_{0.15}$Mn$_{0.35}$O$_2$ |
| Total charge capacity of first negative electrode sheet when first battery cell is at 100% SOH and 0% SOC [Ah] | 105 | 105 | 105 | 105 |
| Total charge capacity of second negative electrode sheet when second battery cell is at 100% SOH and 0% SOC [Ah] | 95 | 95 | 95 | 95 |
| Ratio of total charge capacities of first negative electrode sheet and second negative electrode sheet | 110% | 110% | 110% | 110% |
| Rated capacity of first battery cell [Ah] | 100 | 100 | 100 | 100 |
| Rated capacity of second battery cell [Ah] | 90 | 90 | 90 | 90 |
| Ratio of rated capacities of first battery cell and second battery cell | 111% | 111% | 111% | 111% |
| Compacted density of first negative electrode sheet [g/cm$^3$] | 1.30 | 1.30 | 1.30 | 1.30 |
| Compacted density of second negative electrode sheet [g/cm$^3$] | 1.30 | 1.30 | 1.30 | 1.30 |
| Ratio of compacted densities | 100% | 100% | 100% | 100% |
| Coating mass per unit area of first negative electrode [mg/cm$^2$] | 6.0 | 17.0 | 5.5 | 17.5 |
| Coating mass per unit area of second negative electrode [mg/cm$^2$] | 6.0 | 17.0 | 5.5 | 17.5 |
| Ratio of coating mass | 100% | 100% | 100% | 100% |

TABLE 5-continued

|  | Example 15 | Example 16 | Example 17 | Example 18 |
|---|---|---|---|---|
| Discharge capacity of negative electrode sheet of first battery cell at the 1000th circle [Ah] | 104 | 103 | 104 | 103 |
| Discharge capacity of negative electrode sheet of second battery cell at the 1000th circle [Ah] | 94 | 93 | 94 | 93 |
| Ratio of discharge capacities of negative electrode sheets at the 1000th circle | 110% | 111% | 110% | 111% |
| Capacity retention rate of battery module at the 1000th cycle | 93% | 87% | 94% | 85% |

According to the above Table 5, when coating mass per unit area of a negative active substance of a first negative electrode sheet (coating mass per unit area of a negative active substance of a second negative electrode sheet) is 5.5 or 17.5, that is, less than 6.0 or more than 17.0 (not within the range of 6.0 to 17.0), and other conditions are exactly the same (Examples 17, 18), a capacity retention rate of a battery module at the 1000th circle decreases as compared with Examples 15 and 16.

It can be seen from this that, compared with Examples 17 and 18, Examples 15 and 16 of the present application can increase the capacity retention rate of the battery module at the 1000th circle, and can further improve the overall life and overall performance of the battery module.

In addition, in the above Examples and Comparative Examples, a positive electrode sheet of a first-type battery cell is made of $LiFePO_4$, but the positive electrode sheet of the first-type battery cell can also be made of other materials, such as $LiMn_{0.5}Fe_{0.5}PO_4$, $LiMn_{0.6}Fe_{0.4}PO_4$, $LiMn_{0.7}Fe_{0.3}PO_4$, $Na_3V_2(PO_4)_2O_2F$, $LiFe_{0.998}Ti_{0.002}PO_4$, and $LiFe_{0.995}Ti_{0.005}PO_4$.

Hereinafter, Table 6 shows Examples 19-25 in a case where a positive electrode sheet of a first-type battery cell or a second type battery cell is made of different materials.

TABLE 6

|  | Example 19 | Example 20 | Example 21 | Example 22 |
|---|---|---|---|---|
| Positive active substance of first battery cell | $LiMn_{0.5}Fe_{0.5}PO_4$ | $LiMn_{0.6}Fe_{0.4}PO_4$ | $LiMn_{0.7}Fe_{0.3}PO_4$ | $Na_3V_2(PO_4)_2O_2F$ |
| Positive active substance of second battery cell | $LiNi_{0.55}Co_{0.12}Mn_{0.33}O_2$ | $LiNi_{0.55}Co_{0.12}Mn_{0.33}O_2$ | $LiNi_{0.55}Co_{0.12}Mn_{0.33}O_2$ | $Na_{0.93}Cu_{0.22}Fe_{0.3}Mn_{0.48}O_2$ |
| Total charge capacity of first negative electrode sheet when first battery cell is at 100% SOH and 0% SOC [Ah] | 104.5 | 104 | 103 | 102 |
| Total charge capacity of second negative electrode sheet when second battery cell is at 100% SOH and 0% SOC [Ah] | 102 | 100 | 101 | 94 |
| Ratio of total charge capacities of first negative electrode sheet and second negative electrode sheet | 102% | 104% | 102% | 109% |
| Rated capacity of first battery cell [Ah] | 100 | 100 | 100 | 100 |
| Rated capacity of second battery cell [Ah] | 103 | 102 | 101 | 91 |
| Ratio of rated capacities of first battery cell and second battery cell | 97% | 98% | 99% | 110% |
| Compacted density of first negative electrode sheet [g/cm³] | 1.35 | 1.40 | 1.50 | 1.10 |
| Compacted density of second negative electrode sheet [g/cm³] | 1.42 | 1.33 | 1.43 | 1.00 |
| Ratio of compacted densities | 95% | 105% | 105% | 110% |

TABLE 6-continued

|  | | | | |
|---|---|---|---|---|
| Coating mass per unit area of first negative electrode [mg/cm$^2$] | 12.0 | 13.0 | 14.0 | 7.0 |
| Coating mass per unit area of second negative electrode [mg/cm$^2$] | 12.6 | 12.4 | 13.3 | 6.3 |
| Ratio of coating mass | 95% | 105% | 105% | 110% |
| Discharge capacity of negative electrode sheet of first battery cell at the 1000th circle [Ah] | 103 | 102 | 102 | 98 |
| Discharge capacity of negative electrode sheet of second battery cell at the 1000th circle [Ah] | 100 | 98 | 99 | 88 |
| Ratio of discharge capacities of negative electrode sheets at the 1000th circle | 102% | 104% | 102% | 111% |
| Capacity retention rate of battery module at the 1000th cycle | 92% | 91% | 88% | 91% |

|  | Example 23 | Example 24 | Example 25 |
|---|---|---|---|
| Positive active substance of first battery cell | LiFe$_{0.998}$Ti$_{0.002}$PO$_4$ | LiFe$_{0.995}$Ti$_{0.005}$PO$_4$ | LiFePO$_4$ |
| Positive active substance of second battery cell | LiNi$_{0.65}$Co$_{0.079}$Mn$_{0.27}$Zr$_{0.001}$O$_2$ | LiNi$_{0.70}$Co$_{0.065}$Mn$_{0.24}$Ti$_{0.003}$W$_{0.002}$O$_2$ | NCM-333 |
| Total charge capacity of first negative electrode sheet when first battery cell is at 100% SOH and 0% SOC [Ah] | 105 | 104 | 107 |
| Total charge capacity of second negative electrode sheet when second battery cell is at 100% SOH and 0% SOC [Ah] | 101 | 98 | 89 |
| Ratio of total charge capacities of first negative electrode sheet and second negative electrode sheet | 104% | 106% | 120% |
| Rated capacity of first battery cell [Ah] | 100 | 100 | 100 |
| Rated capacity of second battery cell [Ah] | 98 | 96 | 83 |
| Ratio of rated capacities of first battery cell and second battery cell | 102% | 104% | 120% |
| Compacted density of first negative electrode sheet [g/cm$^3$] | 1.65 | 1.30 | 1.20 |
| Compacted density of second negative electrode sheet [g/cm$^3$] | 1.65 | 1.30 | 1.20 |
| Ratio of compacted densities | 100% | 100% | 100% |
| Coating mass per unit area of first negative electrode [mg/cm$^2$] | 11.0 | 10.5 | 8.0 |

TABLE 6-continued

| | | | |
|---|---|---|---|
| Coating mass per unit area of second negative electrode [mg/cm$^2$] | 11.0 | 10.5 | 8.0 |
| Ratio of coating mass | 100% | 100% | 100% |
| Discharge capacity of negative electrode sheet of first battery cell at the 1000th circle [Ah] | 104 | 103 | 105 |
| Discharge capacity of negative electrode sheet of second battery cell at the 1000th circle [Ah] | 100 | 97 | 87 |
| Ratio of discharge capacities of negative electrode sheets at the 1000th circle | 104% | 106% | 121% |
| Capacity retention rate of battery module at the 1000th cycle | 96% | 98% | 93% |

According to the above Table 6, it can be seen that after doping and coating as well as an optimized design, in Example 23 (a positive electrode sheet of a first-type battery cell is made of LiFe$_{0.998}$Ti$_{0.002}$PO$_4$ and a positive electrode sheet of a second-type battery cell is made of LiNi$_{0.65}$Co$_{0.079}$Mn$_{0.27}$Zr$_{0.001}$O$_2$), and Example 24 (a positive electrode sheet of a first-type battery cell is made of LiFe$_{0.995}$Ti$_{0.005}$PO$_4$, and a positive electrode sheet of a second-type battery cell is made of LiNi$_{0.70}$Co$_{0.065}$Mn$_{0.24}$Ti$_{0.003}$W$_{0.002}$O$_2$), a capacity retention rate of a module at the 1000th cycle is 96% and 98% respectively, which exhibits the most excellent cycle life.

The various examples or embodiments in this specification are described in a progressive manner, each embodiment focuses on the differences from other embodiments, and the same or similar parts between the various examples can refer to each other.

In the description of the present specification, the description of reference terms "one embodiment", "some embodiments", "an exemplary embodiment", "an example", "a specific example", "some examples", or the like refers to a particular feature, structure, material or characteristic described in combination with the embodiment or example included in at least one embodiment or example of the present application. In the present specification, schematic expressions of the foregoing terms do not necessarily refer to the same embodiment or example. Moreover, the particular feature, structure, material, or characteristic described may be combined in a suitable manner in any one or more embodiments or examples.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, and such modifications and replacements will not make the nature of the corresponding technical solutions depart from the scope of the embodiments of the present application.

What is claimed is:

1. A battery module comprising a first-type battery cell and a second-type battery cell at least connected in series, wherein the first-type battery cell and the second-type battery cell are battery cells of different chemical systems,
   the first-type battery cell comprises at least one of N first battery cells, and
   the second-type battery cell comprises at least one of M second battery cells, where N and M are positive integers; and
   when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

2. The battery module according to claim 1, wherein:
   when the battery state of health (SOH) of the first battery cell is the same as the SOH of the second battery cell, and the state of charge (SOC) of the first battery cell is the same as the SOC of the second battery cell, the ratio of the total charge capacity of the first negative electrode sheet to the total charge capacity of the second negative electrode sheet is 0.9 to 1.1.

3. The battery module according to claim 1, wherein:
   a ratio of a discharge capacity of the first negative electrode sheet to a discharge capacity of the second negative electrode sheet is 0.8 to 1.2, optionally, 0.9 to 1.1.

4. The battery module according to claim 1, wherein:
   a ratio of a rated capacity of the first-type battery cell to a rated capacity of the second-type battery cell is 0.8 to 1.2, optionally, 0.9 to 1.1.

5. The battery module according to claim 1, wherein the first negative electrode sheet and the second negative electrode sheet further satisfy at least one of the following conditions:
   (1) a ratio of a compacted density of the first negative electrode sheet to a compacted density of the second negative electrode sheet is 0.85 to 1.15, optionally, 0.95 to 1.05;

(2) a ratio of coating mass per unit area of the first negative electrode sheet to coating mass per unit area of the second negative electrode sheet is 0.85 to 1.15, optionally, 0.95 to 1.05; and (3) a ratio of porosity of the first negative electrode sheet to porosity of the second negative electrode sheet is 0.8 to 1.25, optionally, 0.9 to 1.1.

6. The battery module according to claim 1, wherein:
a compacted density of the first negative electrode sheet and a compacted density of the second negative electrode sheet are each independently 1.0 g/cm$^3$ to 1.9 g/cm$^3$, optionally, 1.2 g/cm$^3$ to 1.8 g/cm$^3$.

7. The battery module according to claim 1, wherein:
coating mass per unit area of the first negative electrode sheet and coating mass per unit area of the second negative electrode sheet are each independently 6 mg/cm$^2$ to 17 mg/cm$^2$, optionally, 8 mg/cm$^2$ to 14 mg/cm$^2$.

8. The battery module according to claim 1, wherein:
porosity of the first negative electrode sheet and porosity of the second negative electrode sheet are each independently 15% to 35%, optionally, 20% to 30%.

9. The battery module according to claim 1, wherein:
a negative active substance of the first negative electrode sheet and a negative active substance of the second negative electrode sheet may be independently selected from one or more of artificial graphite, natural graphite, soft carbon, hard carbon, silicon-based materials, tin-based materials, and lithium titanate,
optionally, the negative active substance of the first negative electrode sheet and the negative active substance of the second negative electrode sheet have the same composition.

10. The battery module according to claim 1, wherein:
a ratio of the number of first-type battery cells to the number of second-type battery cells is 0.1 to 50, optionally, 2 to 10.

11. A battery pack, comprising a battery module, the battery module comprising a first-type battery cell and a second-type battery cell at least connected in series, wherein the first-type battery cell and the second-type battery cell are battery cells of different chemical systems,
the first-type battery cell comprises at least one of N first battery cells, and
the second-type battery cell comprises at least one of M second battery cells, where N and M are positive integers; and
when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

12. A power consumption apparatus, comprising a battery module or a battery pack comprising the battery module, wherein the battery module or the battery pack is used as a power supply or an energy storage unit of the power consumption apparatus, the battery module comprising a first-type battery cell and a second-type battery cell at least connected in series, wherein the first-type battery cell and the second-type battery cell are battery cells of different chemical systems,
the first-type battery cell comprises at least one of N first battery cells, and
the second-type battery cell comprises at least one of M second battery cells, where N and M are positive integers; and
when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2.

13. A manufacturing method of a battery module, comprising the following steps:
obtaining a first-type battery cell and a second-type battery cell, wherein the first-type battery cell and the second-type battery cell are battery cells of different chemical systems,
the first-type battery cell comprises N first battery cell(s), and
the second-type battery cell comprises M second battery cell(s), where N and M are positive integers; and
when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2; and
electrically connecting the first-type battery cell and the second-type battery cell in a manner including series connection to form the battery module according to claim 1.

14. A manufacturing device of a battery module, comprising:
a clamping arm unit configured to obtain a first-type battery cell and a second-type battery cell, wherein the first-type battery cell and the second-type battery cell are battery cells of different chemical systems,
the first-type battery cell comprises N first battery cell(s), and
the second-type battery cell comprises M second battery cell(s), where N and M are positive integers; and
when a battery state of health (SOH) of a first battery cell is the same as an SOH of a second battery cell, and a state of charge (SOC) of the first battery cell is the same as an SOC of the second battery cell, a ratio of a total charge capacity of a first negative electrode sheet of the first battery cell to a total charge capacity of a second negative electrode sheet of the second battery cell is 0.8 to 1.2;
an assembling unit configured to electrically connect the first-type battery cell and the second-type battery cell in a manner including series connection to form the battery module according to claim 1; and
a control unit configured to control the clamping arm unit and the assembling unit.

* * * * *